United States Patent [19]
Yajima et al.

[11] Patent Number: 5,820,809
[45] Date of Patent: Oct. 13, 1998

[54] MANUFACTURING METHOD FOR KEY TOPS

[75] Inventors: Hiroshi Yajima; Masayuki Kashino; Akihiro Tsuji; Masaru Nakajo; Motoshi Yamauchi; Nobuaki Oji, all of Iwatsuki, Japan

[73] Assignee: Polymatech Co., Ltd., Tokyo, Japan

[21] Appl. No.: 739,688

[22] Filed: Oct. 29, 1996

[30] Foreign Application Priority Data

Nov. 1, 1995 [JP] Japan .................................. 7-306402

[51] Int. Cl.$^6$ .......................... B29C 43/18; B29C 51/10; B29C 59/16
[52] U.S. Cl. .......................... 264/400; 264/511; 264/554; 264/132; 264/266
[58] Field of Search ................... 264/400, 132, 264/266, 511, 553, 554

[56] References Cited

U.S. PATENT DOCUMENTS

| | | | |
|---|---|---|---|
| 4,369,157 | 1/1983 | Conner | 264/266 |
| 4,500,218 | 2/1985 | Nishikawa . | |
| 4,657,419 | 4/1987 | Takakuwa | 264/132 |
| 4,710,330 | 12/1987 | Lewandowski et al. | 264/132 |
| 5,514,319 | 5/1996 | Young | 264/132 |
| 5,573,107 | 11/1996 | Nakano et al. . | |
| 5,589,121 | 12/1996 | Inagaki et al. | 264/266 |
| 5,655,826 | 8/1997 | Kouno et al. . | |

FOREIGN PATENT DOCUMENTS

| | | | |
|---|---|---|---|
| 58-132529 | 8/1983 | Japan | 264/511 |
| 6-92090 | 4/1994 | Japan . | |

*Primary Examiner*—Mathieu D. Vargot
*Attorney, Agent, or Firm*—McGlew and Tuttle

[57] ABSTRACT

A manufacturing method for key tops includes the steps of molding a light-shielding film on a to-be-peeled shield by a plane printing, effecting colored printing to provide a read-out part at a predetermined position on it in the state of a plane sheet prior to the 3-D molding, then sucking a printed light-shield film sheet on a metal mold with an evacuation system, adsorbing said light-shield film sheet onto the wall face in the metal mold. A push mold may be used with a suction system so as to be positioned in the female mold. Materials such as silicone are put into this metal mold for one-piece molding. A laser processing is effected on the surface of a key top prepared in a 3-D shape to form a desired pattern. By making the light-shield printing and pattern printing in the state of a plane sheet prior to the 3-D molding and effecting only a pattern processing by laser cut in the state of a stereographic shape, a laborious coating has been omitted which also results in improved accuracy of printing and at the same time a reduced number of steps.

14 Claims, 4 Drawing Sheets

MANUFACTURING METHOD FOR KEY TOPS

BACKGROUND OF THE INVENTION

1. Field of the Invention

The present invention relates to a manufacturing method for key tops of switches incorporated in the input section of telephone sets, audio equipment, TV sets, video tape recorders, facsimile terminal equipment, copying machines, and car-mounted equipment.

2. Description of the Prior Art

A conventional manufacturing method for key tops comprises the steps of: first, molding a material into the shape of a key top; coating the whole surface of this 3-D shaped material in white; further printing a colored pattern such as designation on the top face; then coating the whole surface in black for shield of light; and forming a desired pattern by laser cut of the top face.

There is another manufacturing method comprising the step of putting a readout part in metal mold beforehand for molding.

With a conventional manufacturing method, because coating and printing are made on a 3-D molded key top, first, an ink jet nozzle must be swung in all directions in coating four sides and gaps between the 3-D portions also, to say nothing of the 3-D shaped top faces, thereby requiring a facility and a space for such a way of spray coating. In addition, it is difficult or needs a great amount of time to uniformly coat every face of the 3-D material and all its gaps.

And, the need for a wide working space is often accompanied by a danger of dust adherence, thus leading to rejection of many inferior products. Furthermore, loss of uniformity in coat will bring about variations in thickness, thus leading to a bad cut of laser processing in the posterior process.

Meanwhile, to effect a printing on the top faces after the completion of 3-D molding, a printing must be made on the top faces of various heights and consequently a uniform printing cannot be made or several repetitions of printing are needed, thus requiring a great amount of time.

The method by putting a readout part in metal mold beforehand needs a clamp for registration of the readout film, having a problem in accuracy, and further might cause a film distortion in the time of molding.

BRIEF SUMMARY OF THE INVENTION

By making an light-shield printing and pattern printing in the state of a plane sheet prior to the 3-D molding and effecting only a pattern processing by laser cut in the state of a stereographic shape, the present invention has omitted a laborious coating, improved the accuracy of printing and at the same time reduced the number of steps in manufacture greatly.

Thus, since printing is made in the state of a plane sheet, the degree of difficulty greatly differs and the accuracy of printing is raised as compared with a printing made after the 3-D molding. In addition, it becomes possible to previously effect a printing on a groove 9 between individual key faces on which no printing can be carried out after molding.

Because a processing by printing, not by coating, can be made, no need for a large space, absence of inferiority due to the adherence of dust and no contamination arising from the scatter of ink in the case of coating are seen and moreover a uniform printing even on sides and gaps is attainable. And the process of manufacture can be greatly shortened.

DETAILED DESCRIPTION OF THE PREFERRED EMBODIMENTS

Figure 1:
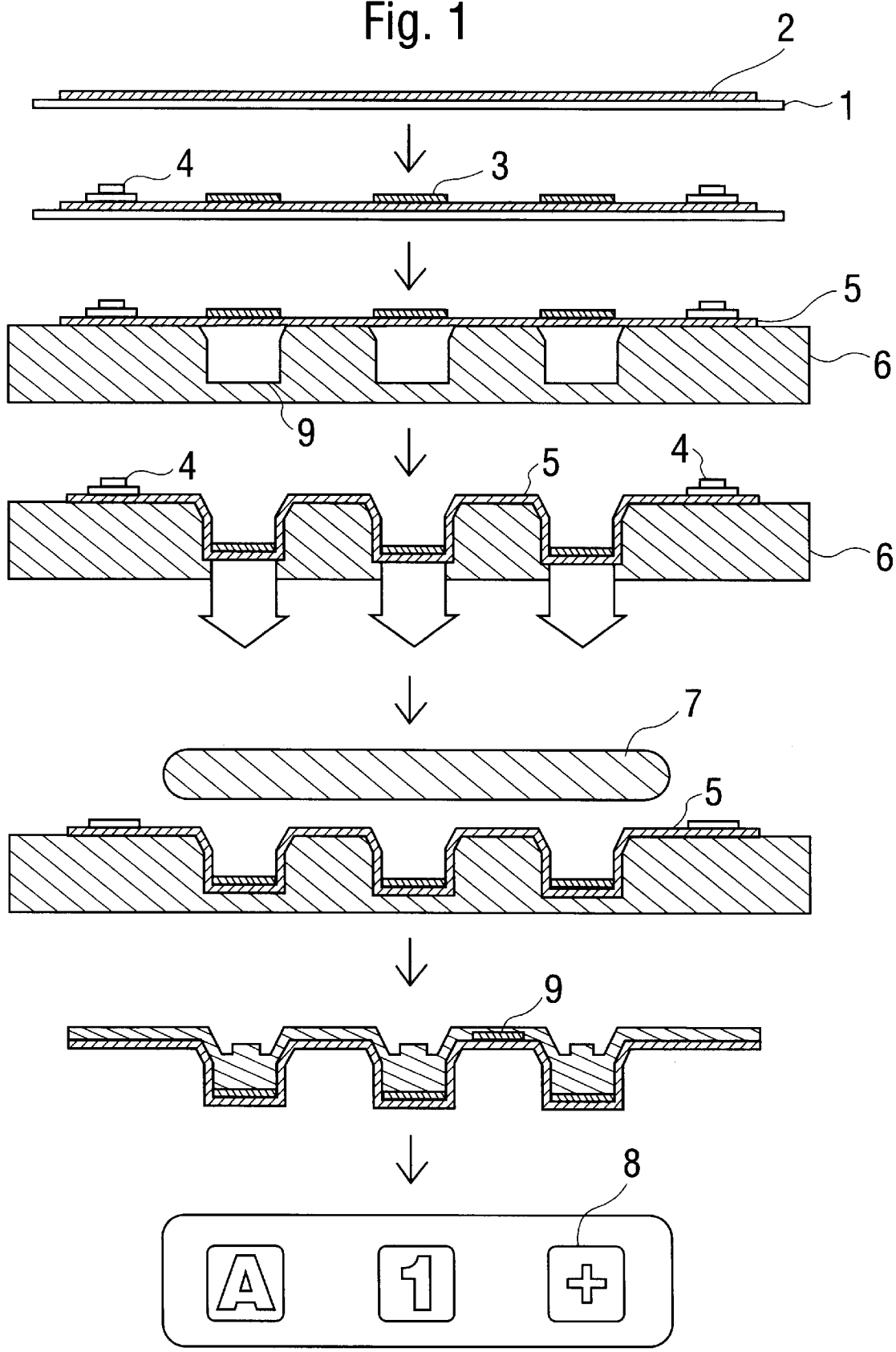
FIG. 1 illustrates the steps in manufacture.

The present invention makes a black daubed printing on a peeled sheet 1 such as a fluorine film with light shielding ink 2, e.g., silicon ink, to form a light shielding film, then either effects a white daubed printing according to the need for a high quality design or a desired colored printing 3 as a readout at predetermined positions corresponding to key tops positions and finishes the printing process. At this time of printing, a frame 4 is established by gluing it to the circumference.

Next, the peeled sheet 1 is peeled off and a light-shield film sheet 5 is laid onto the metal mold, when the light-shield film sheet 5 is tensed with the frame 4.

Because of prearranged heat application during the curing of ink, a peeled sheet 1 needs heat resistance and is desired to be of silicone group, fluorine group, imide group, etc. from which a light-shield film is easily peeled off. Stretched and sucked, a light-shield film is desired to be an elastic film usually of silicon group, urethane group, acryl group, epoxy group and other synthetic rubber group, extensible above 300%. The forming methods thereof include printing and coating, but printing is preferable from the standpoint of the control of a light-shielding film and the extent of working space.

In addition, prior to the formation of light-shielding ink 2 as an elastic light-shield film on the peeled sheet 1, a reinforcing film may be formed by using light-pervious ink, if necessary, to promote the film strength. After the formation of a key sheet, this reinforcing film is provided for the purpose of promoting the wear durability of the surface because the wear of the key top corner portion in a practical use might entail a quality deterioration of commodities due to a leak of light from the bottom light source when a key sheet with the key top attached is used as the key switch for a portable phone and such others. The wear durability, though dependent on the film thickness of a reinforcing film and the shape of a key top, is promoted about 1.5–2.0 times.

As a metal mold 6, a generally used evacuation metal mold, if necessary, an evacuation mold of material with minute pores made, is used and the printed sheet 5 is attracted through this metal mold by suction. For example, the silicone sheet 5 formed with silicon ink is extended to each fixed position in the metal mold without compulsion, sucked and preformed because of usually being extensible above 300% as mentioned above.

Afterward, with the printed sheet 5 left in the metal mold 6, a material 7 such as silicone is put into for molding, then the top face of the key top is processed under laser beams to make out a readout such as letters, patterns 8 or the like.

Incidentally, by using a light-pervious ink instead of a black, grey and other deep-colored light-shielding ink, a light-irradiating key top can be manufactured.

In addition, the metal mold used for evacuation molding includes a mold with numerous fine pores not only on the bottom face but also on the side face of each cavity or a mold of porous material wherein a print sheet 5 placed thereon is sucked in for premolding as shown in FIG. 1.

Figure 2:
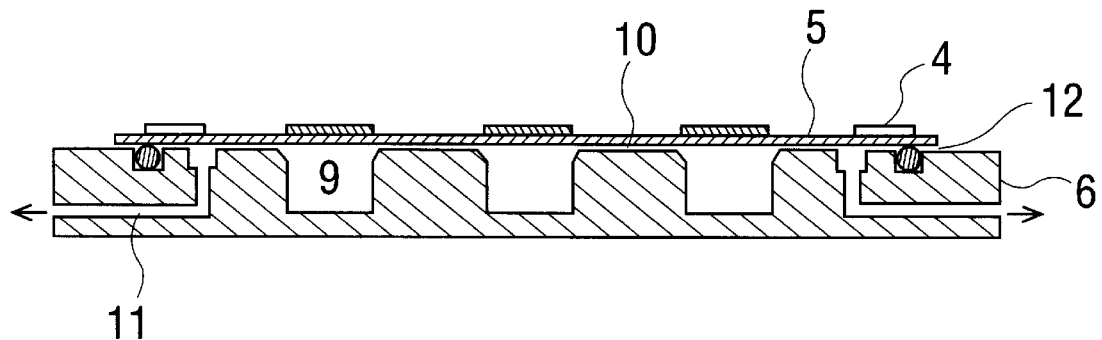
FIG. 2 is a sectional view showing another metal mold.
Figure 3:
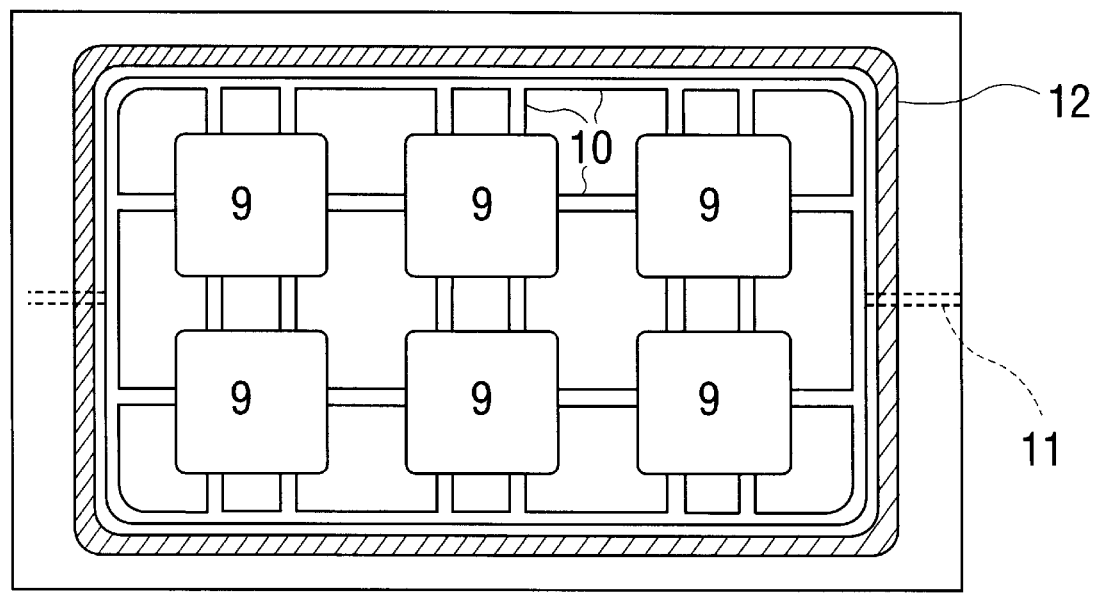
FIG. 3 is a top view showing the plane of FIG. 2.

As shown in FIG. 2, another metal mold includes, not a method to suck the print sheet 5 from the bottom face or the side face of each cavity, but a metal mold 6 wherein a suction path 10 leading to the respective cavities 9 is formed on the surface thereof and is connected to a suction port 11. The interiors of individual cavities 9 takes a negative pressure by the start of suction and a print sheet 5 placed on the top is attracted in conformity to the shape of the metal shape and is premolded.

Incidentally, with the aim of securing the air-tightness at this time, it is advisable to dispose a packing 12 below the surrounding frame 4.

Figure 4:
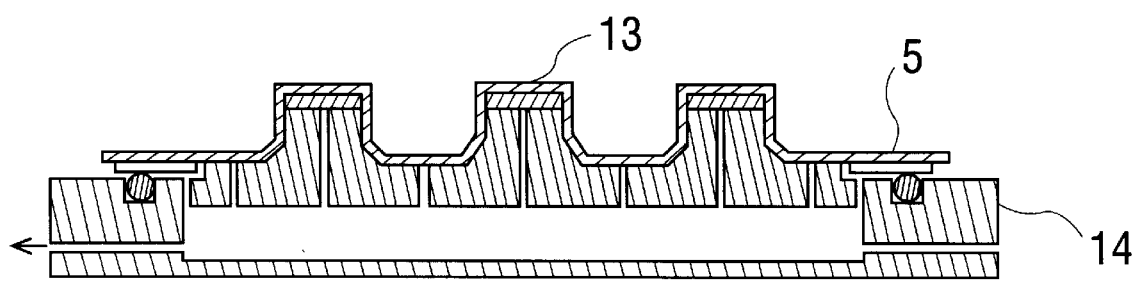
FIG. 4 is a sectional view showing a push jig.
Figure 5:
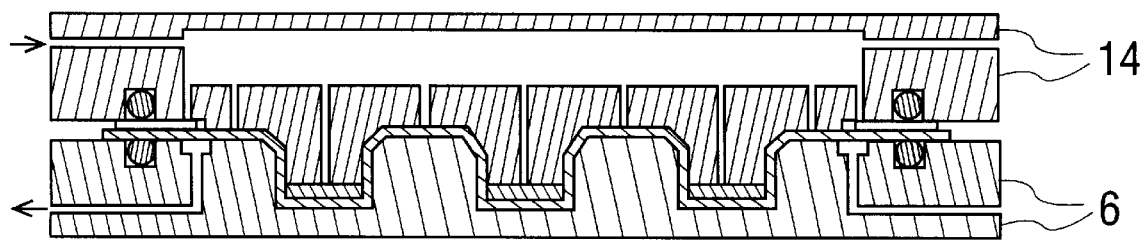
FIG. 5 is a sectional view showing the setting of a push jig.

In addition, for a more precise positioning of a color-printed portion of the display section to a metal mold, a printed sheet 5 is attracted and retained, by using a suction type push jig 14 with those protrusions 13 of male mold shape which enter such cavities of the mold as shown in FIG. 4, to match this push jig 14 into the metal mold 6. By releasing the attraction of the push jig 14 simultaneously with the start of suction of the metal mold 6, the printed sheet 5 can be precisely positioned at a predetermined position of the metal mold 6 for suction. Thereafter, the push jig 14 is detached and an elastic material such as silicone rubber, natural rubber or other synthetic rubbers is inserted to effect a on-piece molding.

Furthermore, according to the invention mentioned above, the display section of characters, symbols or the like is created after the completion of a 3-D molding, but printing of a light-shielding film is finished beforehand except for the display section of characters, symbols or the like in the formation of the light-shielding film on a to-be-peeled sheet with light-shielding ink and all works by a laser processing, related to the display section of characters, symbols or the like, can be performed on the plane sheet, so that the operation can be greatly simplified.

Figure 6:
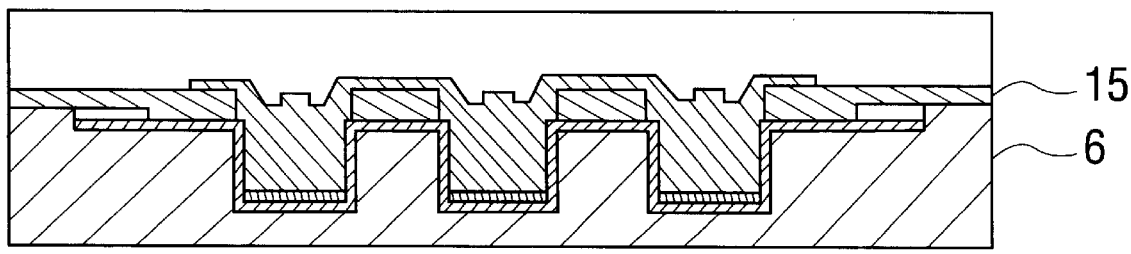
FIG. 6 is a sectional view showing the insertion of a cored mold.
Figure 7:
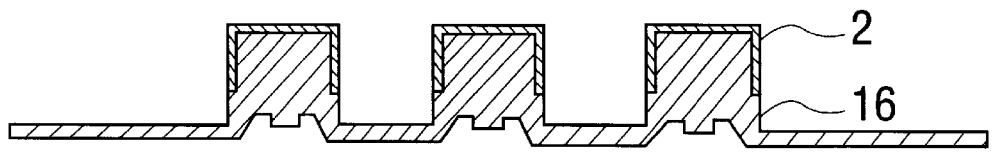
FIG. 7 illustrates a key top molded using a cored mold.

And yet, when a key top is molded with a material such as silicone after a printed light-shielding film 5 is attracted into the metal mold, molding is effected by using a cored mold 15 put onto a metal mold 6 as shown in FIG. 6, so that a key top with the upper portion alone subjected to a light-shielded change can be manufactured.

Figure 8:
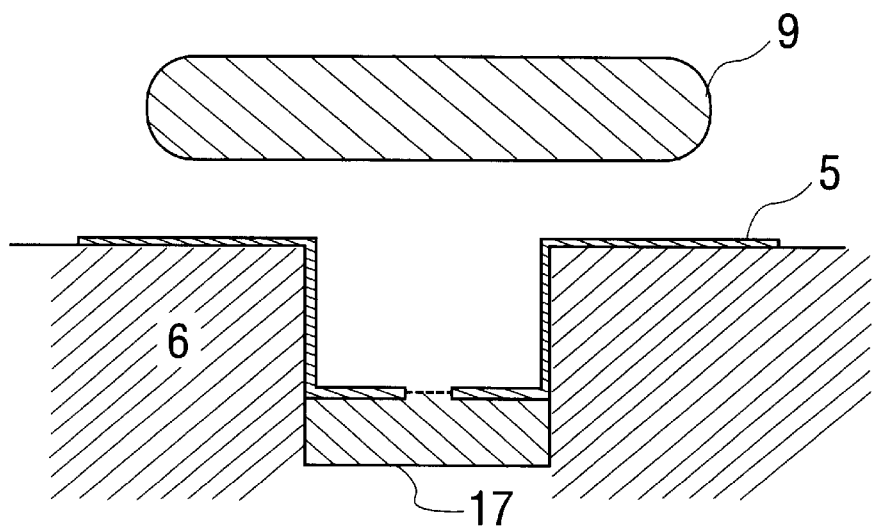
FIG. 8 is a sectional view showing the molding of a key top molded article inserted in a metal mold.

And still furthermore, as shown in FIG. 8, a key top molded article 17 comprising a premolded heat-resistant transparent resin, for example, thermoplastic resin such as fluorine group, polysulfone group and polyimide group or thermo-setting resin such as phenol group, melamine group, epoxy group, silicone group and diallyl phthalate group, which is not deteriorated under the influence of the temperature of an inserted metal mold is inserted before the attraction of a printed light-shielding film 5 into the metal mold 6. Thereafter, a similar molding to that of other embodiment enables a key top with a hard top face, an elastic base portion and a covered character face of non-erasable characters to be obtained.

What is claimed is:

1. A manufacturing method for key tops comprising the steps of:

applying a light-shielding film on a to-be-peeled sheet in a plane, by plane printing with light-shielding ink;

effecting a colored printing to provide a readout part at a predetermined position on said light-shielding film with a desired color while said light-shielding film is disposed substantially in a plane;

subsequent to said step of effecting a colored printing, peeling off the to-be-peeled film leaving a printed lightshield film sheet;

sucking said printed lightshield film sheet on a metal mold with many vent holes made therein for evacuation;

adsorbing said light-shield film sheet onto the wall face in the metal mold;

putting material into said metal mold for onepiece molding; and effecting a laser processing on the surface of a key top prepared in a 3-D shape to form a desired pattern.

2. The manufacturing method for key tops according to claim 1, wherein said said material put into said metal mold is silicone.

3. A manufacturing method for key tops comprising the steps of:

applying a light-shielding film on a to-be-peeled sheet in a plane, by plane printing with light-shielding ink except for a region of a display character and pattern portions;

effecting a colored printing to provide a readout part at a predetermined position on said light-shielding film with a desired color while said light-shielding film is disposed substantially in a plane;

subsequent to said step of effecting a colored printing, peeling off the to-be-peeled film leaving a printed lightshield film sheet;

sucking said printed lightshield film sheet on a metal mold with many vent holes made therein for evacuation;

adsorbing said light-shield film sheet onto the wall face in the metal mold; and putting material into said metal mold for onepiece molding.

4. The manufacturing method for key tops according to claim 3, wherein said said material put into said metal mold is silicone.

5. A manufacturing method for key tops as set forth in claim 1, wherein said vent holes of said metal mold define suction paths leading to respective cavities for the evacuation of said metal mold.

6. A manufacturing method for key tops as set forth in claim 1, wherein molding is effected by using a cored mold put onto said metal mold with said printed light-shielding film placed thereon so that only the upper portion is light-shielded.

7. A manufacturing method for key tops as set forth in claim 1, further comprising the step of forming a surface sheet by use of transparent ink instead of light-shielded ink.

8. A manufacturing method for key tops as set forth in claim 1, wherein said mold includes a female portion and a male portion, a printed light-shielding film sheet is attracted and retained in said step of sucking by using a said male portion as a push mold as a part of said mold, said push mold being of the same shape as that of the said male portion of said mold with suction holes formed therein at appropriate intervals so as to be positioned in the female mold.

9. A manufacturing method for key tops as set forth in claim 1, wherein, a key top molded article comprising a premolded heat-resistant transparent resin is inserted into said metal mold before said step of sucking a printed light-shielding film thereon.

10. A manufacturing method for key tops as set forth in claim 3, wherein said vent holes of said metal mold define suction paths leading to respective cavities for the evacuation of said metal mold.

11. A manufacturing method for key tops as set forth in claim 3, wherein molding is effected by using a cored mold put onto said metal mold with said printed light-shielding film placed thereon so that only the upper portion is light-shielded.

12. A manufacturing method for key tops as set forth in claim 3, further comprising the step of forming a surface sheet by use of transparent ink instead of light-shielded ink.

13. A manufacturing method for key tops as set forth in claim 1, wherein said mold includes a female portion and a male portion, a printed light-shielding film sheet is attracted and retained in said step of sucking by using a said male portion as a push mold as a part of said mold, said push mold being of the same shape as that of said male portion of said mold with suction holes formed therein at appropriate intervals so as to be positioned in the female mold.

14. A manufacturing method for key tops as set forth in claim 3, wherein, a key top molded article comprising a premolded heat-resistant transparent resin is inserted into said metal mold before said step of sucking a printed light-shielding film thereon.

\* \* \* \* \*